UNITED STATES PATENT OFFICE.

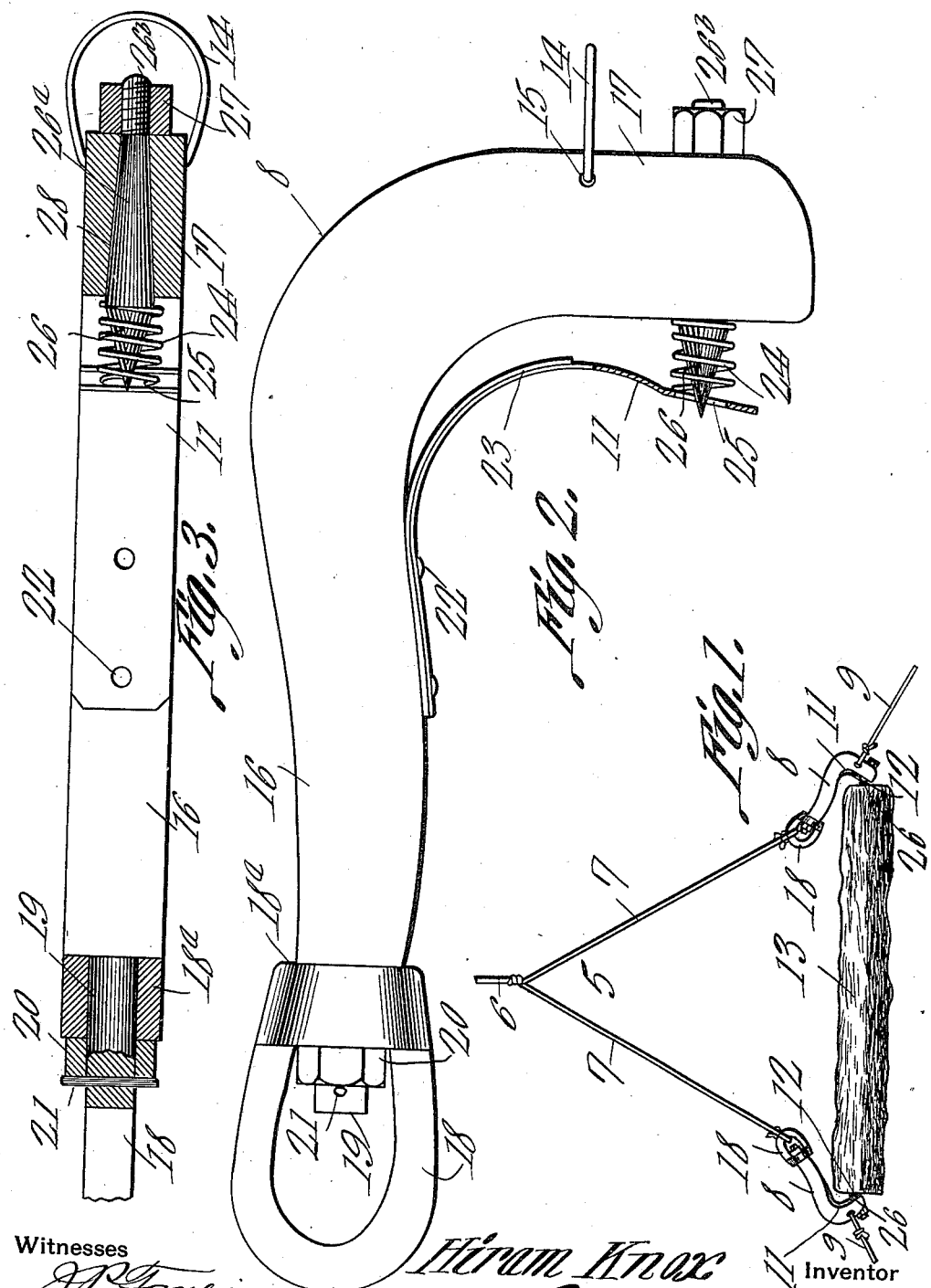

HIRAM KNOX, OF LIVINGSTON, TEXAS.

HOOK.

1,014,008.  Specification of Letters Patent.  Patented Jan. 9, 1912.

Application filed July 10, 1911. Serial No. 637,840.

*To all whom it may concern:*

Be it known that I, HIRAM KNOX, a citizen of the United States, residing at Livingston, in the county of Polk and State of Texas, have invented a new and useful Hook, of which the following is a specification.

This invention relates to hooks and more particularly to what are commonly known as log hooks.

Log hooks are generally employed in connection with a "crotch line" to engage the ends of logs to lift or elevate same and shift or swing them onto a conveyance, such as a car, wagon, boat or the like, by means of a derrick or other mechanism. These hooks are provided with spuds or spurs to bite the end of the log as the log is supported by same, and jerk lines are generally provided to release the hooks when the log is being laid or dropped in place. The jerk lines therefore require the attention of operators to manipulate same, which is both cumbersome and laborsome.

With this disadvantage in view the primary object of this invention is to provide a self releasing hook, the spur of which will be ejected from the end of the log upon the weight of the log being released from the hook. This enables the logs to be rapidly transmitted from one location to another.

A further object is to provide for simplicity in structure, effectiveness in operation and inexpensiveness in the manufacture of a hook of this character.

To the above ends this invention is embodied in the novel construction, arrangement and combination of parts as hereinafter described, and as shown in the accompanying drawings in which similar reference characters indicate equivalent parts, and in which—

Figure 1 is a side elevation of two hooks in application. Fig. 2 is a face view of one hook. Fig. 3 is an elevation of the hook, parts shown in section and parts broken away.

Referring specifically to the drawing, 5 designates the crotch line comprising a draft line 6 and branches 7, to the free ends of which are secured the hooks indicated at 8. The draft line 6 is adapted to be operated from a derrick or other mechanism. The hook itself, in which lies this invention comprises an L-shaped shank 8 having a long arm 16 and a short arm 17. At the outer end of the arm 16 there is a projecting pintle 19, on which is swiveled the head 18$^a$ of a link 8 to which is attached one of the branches of the crotch line. A washer 20 and cotter pin 21 retain the said link in position on the pintle. On the back of the short arm at the outer edge of the same and approximately at its intermediate portion is secured a wire link 14 through an aperture 15 piercing the said arm, which link may be used to attach the jerk line thereto as indicated at 9 in Fig. 1 should same be desired. A tapered opening 28 passes through the other end of the arm 17 approximately parallel to the long arm 16, having the largest diameter disposed inwardly or toward the side of the arm 17 to which the arm 16 is attached. In the opening or socket 28 is arranged a tapered shank 26$^a$ of the spur or spud 26, said shank being secured in position by a nut 27 engaging a projecting end 26$^b$ on the small end of same, although it may be secured in position in a variety of ways. The spur 26 therefore projects from the inner face and outer ends of the arm 17 of the hook 8. The flat springs 23 and 11 are secured by means of rivets 22 or other suitable manner to the inner face of the arms 16, lying one over the other, and which extend toward the arm 17 and are bent or curved toward the outer end of the said arm 17. The outer spring 11 projects beyond the inner spring 23 and has an outer opening or aperture 25 through which the spur 26 is adapted to pass. A coil spring 24 is arranged over the spur 26 and bears at its ends on the inner face of the arm 17 and on the spring 11. Normally the spur 26 is in retracted position with respect to the spring 11, or it can be said that the spring 11 by reason of its tension normally has its free end in proximity of the point of the spud.

In operation the hooks are applied to the ends of the logs as is customary and the "crotch line" is lifted, causing the spurs 26 to bite or engage the ends of the logs to lift the same, the weight of the log overcoming the tension of the springs 11 which bear against the logs or other objects assisted by auxiliary springs 23 and 24 to depress the said springs 11 and permit of the engagement of the spurs and logs; the weight of the log being relieved by being lowered onto a conveyance and the draft line being slackened, the springs 11 cause the ejection of the spurs from the ends of the log by giving an outward tension to the arm carrying the spur and thus let the hooks free without the use of a jerk line. It may be desired, however, to employ a jerk line at times and the link 14 can then be provided for that purpose. The hooks may also be released while the log is in mid-air by giving a quick downward jerk on the "crotch line" which will for an instant relieve the weight of the log from the hooks to allow the spurs to free themselves and the log will naturally drop. This method although being more rapid is a less careful method of handling the logs.

This invention may be altered in its details of construction within the scope of the appended claims without departing from the spirit of the invention, and no precise limitations of form or details are inferred by the construction shown and described.

Having described the invention what is claimed as new is:—

1. The combination with a hook and a spur projecting therefrom adapted to bite an object, of automatic disengaging means adapted to bear against the object to release the spur from the object upon the weight of the object being relieved from the hook.

2. The combination with a hook, and biting means thereon adapted to engage an object, of automatic disengaging means adapted to bear against the object to release the spur from the object upon the weight of the object being relieved from the hook.

3. The combination with a hook and a spur projecting therefrom adapted to bite an object, of a spring secured to the hook and adapted to bear against the object to release the spur from the object upon the weight of the object being relieved from the hook.

4. The combination with a hook and a spur projecting therefrom adapted to bite an object, of a spring secured to the hook and adapted to bear against the object to release the spur from the object upon the weight of the object being relieved from the hook, said spring giving an outward tension to the hook when the spur is in engagement with the object.

5. The combination with a hook and a spur projecting therefrom adapted to bite an object, of a flat spring secured to the hook and having an aperture therein through which the spur is arranged to pass.

6. The combination with a hook and spur projecting therefrom adapted to bite an object, of a flat spring secured to the hook and having an aperture therein through which the spur is arranged to pass, and a coiled spring on the spur seating between the hook and said flat spring.

7. The combination with a hook comprising an L-shaped shank and a spur on the inner face and outer end of the short arm thereof, of flat springs secured to the inner face of the long arm of the shank and bent toward the outer end of the short arm, the outer spring projecting beyond the inner spring and having an aperture through which the said spur is adapted to pass.

In testimony that I claim the foregoing as my own, I have hereto affixed my signature in the presence of two witnesses.

HIRAM KNOX.

Witnesses:
 EVELYN MCGEE,
 LILLIAN KNOX.

Copies of this patent may be obtained for five cents each, by addressing the "Commissioner of Patents, Washington, D. C."